June 23, 1953  C. G. CRUZAN  2,643,367
MAGNETOSTRICTION SEISMOMETER
Filed Jan. 5, 1948  2 Sheets-Sheet 1

INVENTOR.
CHARLES G. CRUZAN
BY Hudson & Young
ATTORNEYS

June 23, 1953  C. G. CRUZAN  2,643,367
MAGNETOSTRICTION SEISMOMETER
Filed Jan. 5, 1948  2 Sheets-Sheet 2
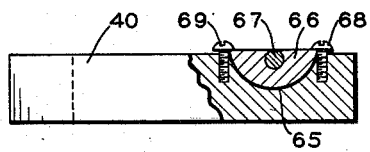
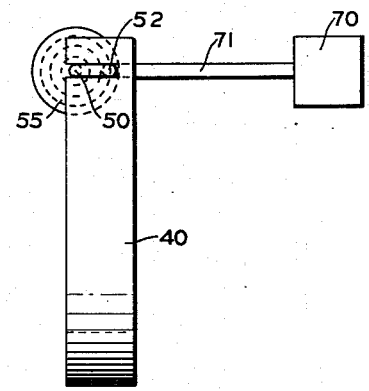
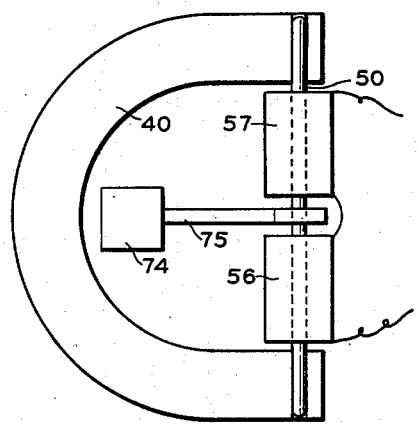
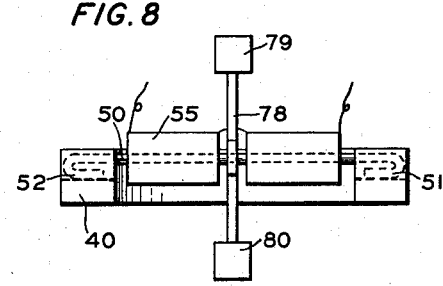
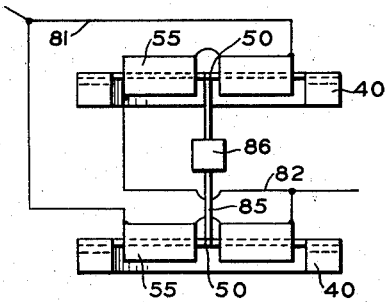
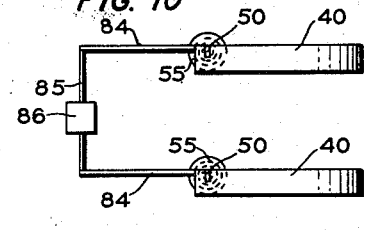
INVENTOR.
CHARLES G. CRUZAN
BY Hudson & Young
ATTORNEYS Patented June 23, 1953

2,643,367

UNITED STATES PATENT OFFICE 2,643,367

MAGNETOSTRICTION SEISMOMETER

Charles G. Cruzan, Bartlesville, Okla., assignor to Phillips Petroleum Company, a corporation of Delaware Application January 5, 1948, Serial No. 599

6 Claims. (Cl. 340—17)

This invention relates to geophones in which earth tremors cause strains in a magnetostrictive member. In a more specific aspect, this invention relates to such geophones in which the magnetostrictive member is subjected to torsional strains by earth tremors.

In my novel geophone construction, a magnetostrictive member is mounted upon a support in a field established by a magnet, such as a horseshoe type permanent magnet, and an inertia body is mechanically connected to the magnetostrictive member. When an earth tremor occurs, the resulting relative movement between the support and the inertia body strains the magnetostrictive member and thereby varies the magnetic reluctance of the magnetostrictive rod which, in turn, varies the flux density of the magnetic field, these variations being picked up by a device, such as a coil wound on the magnetostrictive member, and converted into electrical currents indicative of the nature and magnitude of the earth tremors. It is a feature of the invention that the magnetostrictive geophone may be readily adapted to acceleration type geophones, displacement type geophones, or rotational geophones responsive to ground roll. The strength of the magnetic field may be reinforced by utilizing two magnetostriction units connected in parallel and various embodiments of the basic inventive concept may be made without departing from the principles therein set forth.

It is an object of the invention to provide an improved geophone utilizing the magnetostrictive principle in its operation.

It is a further object of the invention to provide a magnetostriction geophone which utilizes a minimum number of parts, which is simple and rugged in construction, and which may be readily assembled with a minimum of labor.

It is a still further object of the invention to provide a magnetostriction geophone which may be readily adapted for use as a displacement type, acceleration type or rotational geophone.

It is a still further object of the invention to provide a magnetostriction geophone in which earth tremors cause torsional strain in a magnetostrictive member which is converted into electrical currents.

Various other objects, advantages and features of the invention will become apparent from the following detailed description taken in conjunction with the accompanying drawings, in which:

Figure 5 is a detailed view showing a modification of the invention;

Figures 6 and 7 are detailed views of modified permanent magnet assemblies;

Figure 8 is a detailed view of a rotational geophone utilizing the principles of this invention;

Figure 9 is a front elevational view of a geophone assembly utilizing a plurality of magnetostrictive members; and, Figure 10 is an end elevational view of the geophone shown by Figure 9.

Figure 1:
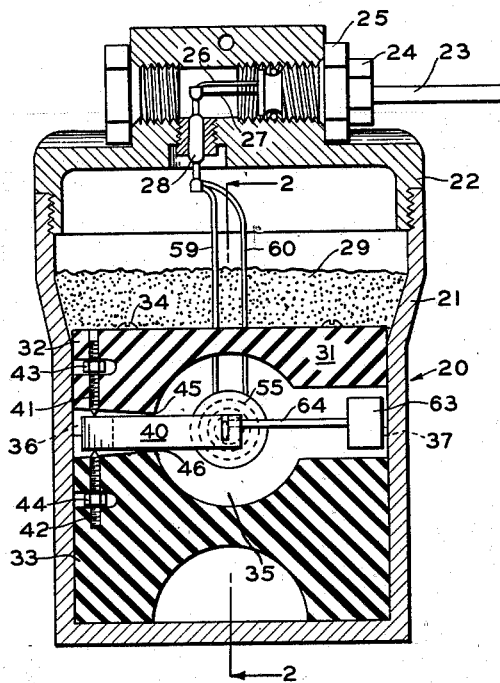
Figure 1 is a sectional view of a geophone constructed in accordance with this invention.
Figure 2:
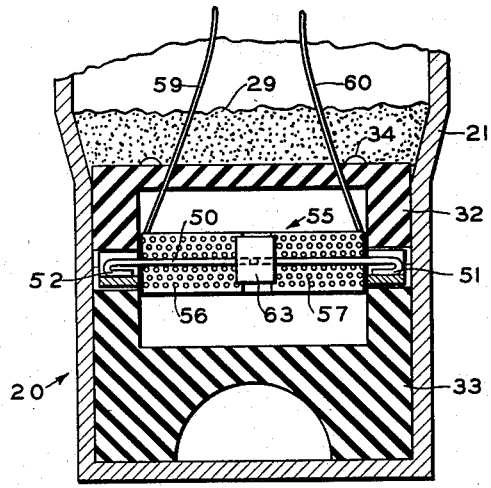
Figure 2 is a sectional view taken along the line 2—2 of Figure 1.
Figure 3:
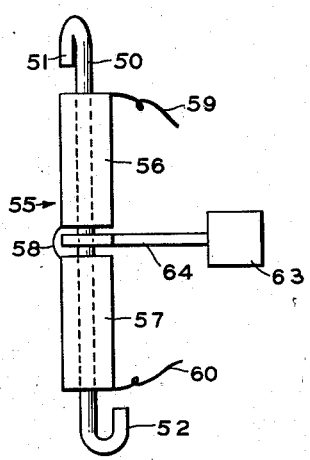
Figure 3 is a detailed view of the magnetostrictive member, inertia body, and pickup coil.

Referring now to the drawings in detail, and particularly to Figures 1 to 4, inclusive, the novel geophone unit 20 is mounted in a case 21 to which is secured a cap 22. A cable 23 extends through sealing plugs 24, 25 in the cap and this cable includes a pair of conductors 26, 27 which extend through glass bead insulators, one of which is shown at 28, into the geophone case. This cap effectively excludes moisture from the case and affords sealed connections for the electrical conductors, this structure being described in detail in the copending application of Cecil L. Brownlow, Serial No. 6,577, now Patent 2,477,172 entitled Geophone Case Cover. A layer of sealing compound 29, such as wax, is provided at the top of the geophone unit to further aid in excluding air and moisture therefrom.

The geophone unit 20 includes a support 31 consisting of a plurality of blocks 32, 33 of a suitable insulating material, such as hard rubber, these blocks being held together by screws 34. The blocks 32, 33 define an interior chamber or cavity 35 and a pair of diametrically opposite smaller recesses 36, 37 are provided communicating with the main chamber 35.

A generally horseshoe shaped permanent magnet 40 is mounted in the recess 36 and this magnet is adjustable vertically, to a limited extent, by non-magnetic clamping screws 41, 42 which are mounted on the respective blocks 32, 33 and which are adjustable by knurled portions 43 and 44, respectively, seated in suitable slots in the aforesaid block members. In order to effect such adjusting action, it will be noted that the portion of recess 36 adjacent the main chamber 35 is smaller or more narrow than the portion of said recess adjacent the casing 21. Accordingly, the magnet 40 may be rocked, to a limited extent, about the points 45, 46 by adjustment of screws 41 and 42.

A pair of aligned grooves 48, 49 are milled or otherwise suitably formed in the respective ends of the horse shoe type magnet 40 and these grooves serve as a support for receiving a magnetostrictive member 50. In the present example, the member 50 comprises a rod of magnetostrictive material, such as nickel, having inwardly bent end portions 51, 52 which fit into the respective grooves 48, 49 and hold the rod in assembled position upon the magnet. Preferably and advantageously, an initial torsional strain is impressed upon the magnetostrictive rod 50 when it is inserted into the grooves. To this end, the bent end portions 51, 52 are originally formed so as to lie in different radial planes, as clearly indicated in Figure 3. Thus, when these end portions are inserted into the aligned slots of the magnet 40, the rod 50 is twisted and an initial torsional strain is applied thereto. It will be apparent that the magnetostrictive rod is supported in the field established by the magnet 40 and, also, that an electromagnetic field can be established by any other type of magnetic device, such as an electromagnetic coil. If desired, an additional magnet may be placed adjacent magnet 40 to increase the strength of the field. Further, the support for the magnetostrictive member 50 could be independent of the magnetic structure, if desired.

A suitable pickup device is provided which is sensitive to variations in the flux density of the field established by the magnet 40. In the examples shown, this pickup device consists of a dual section coil 55 which is preferably wound upon the magnetostrictive rod 50. The sections 56, 57 of the coil have the same number of turns and are symmetrically disposed with respect to the center of the rod 50. The coils are connected in series opposing arrangement so that currents induced therein responsive to stray fields and distortion of coils by strain of the rod 50 are cancelled out by said series opposing connection. To this end, the sections 56, 57 are interconnected by a conductor 58 while the respective ends of the coil terminate in leads 59, 60 which extend through the sealing material 29 and are connected through the glass bead insulators 28 to the respective conductors 26 and 27.

A relatively heavy inertia body 63 is mechanically connected to the central portion of the rod 50 by a relatively light lever arm 64, formed for example from aluminum, and this inertia body is mounted in the recess 37, the upper and lower walls of which limit the movement of the inertia body to prevent undue strain on the magnetostrictive rod 50 and consequent damage to the geophone. The inertia body 63 and the lever arm 64 are both formed from non-magnetic material.

The operation of the described magnetostrictive geophone will now be apparent to those skilled in the art. Assuming that the case is mounted upon the ground in a position to receive earth tremors, movement of the earth will be communicated to the geophone case thereby causing relative movement between the magnet 40 and the inertia body 63. Assuming that this relative movement causes counter-clockwise motion, Figure 4, of the arm 64 and rod 50 with respect to the magnet 40, and assuming the original torsion applied to the rod to be in the direction of the arrows, Figure 4, it will be apparent that such counter-clockwise movement of the arm will decrease the torsion upon the half of the rod adjacent end portion 51 and increase the torsion of the half of the rod adjacent end portion 52. As a result, the magnetic flux density adjacent coil section 56, Figure 3, will be decreased while the magnetic flux density adjacent coil section 57 will be increased thereby inducing currents of opposite polarity in the respective coil sections. However, due to the series opposing connections of these coils, these currents of opposite polarity will be additive and the sum of the induced potentials will appear between conductors 59 and 60.

Figure 4:
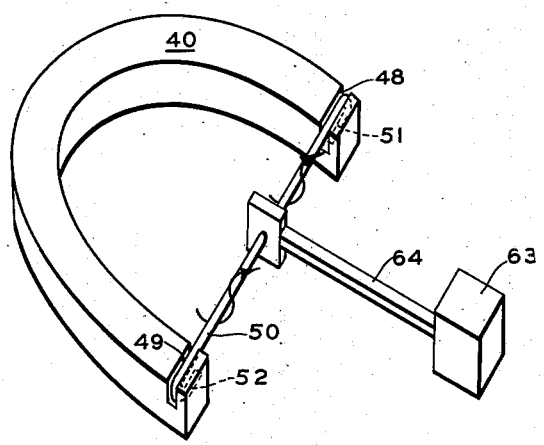
Figure 4 is a perspective view of a permanent magnet assembly.

Assuming that the earth tremor causes clockwise movement, Figure 4, of the arm 64 and rod 50 with respect to the magnet 40, the torsion on the half of the rod adjacent the end portion 51 will be increased while the torsion on the half of the rod adjacent end portion 52 will be decreased. As a result, currents of opposite polarity will be induced in the coil sections 56, 57 and an additive current of opposite polarity will appear between conductors 59 and 60. Accordingly, earth tremors affecting the geophone case will be translated into relative movement between the support and the inertia body to cause torsional strain in the magnetostrictive rod thereby to vary the magnetic reluctance of the rod. This variation, in turn, changes the flux density of the magnetic field and induces a current in the pickup coil.

A modified support for the magnetostrictive rod is shown in Figure 5. In this modification, the groove 65 formed in the magnet 40 is of semicircular cross section and a semicircular member 66 of magnetic material is slidably fitted in this groove. An end portion 67 of the magnetostrictive rod is secured, as by welding, to the member 66 and set screws 68, 69 are provided for adjusting the angular position of the member 66 with respect to the magnet. Assuming that a similar support is provided at the opposite end of the magnetostrictive rod 67, it will be apparent that the initial torsion applied to the rod may be varied as desired by adjustment of the set screws 68 and 69.

In Figures 6 and 7, I have shown modified forms of the invention wherein the initial positions of the inertia body and magnet are varied to provide different mechanical arrangements. In Figure 6, an inertia body 70 is attached to the magnetostrictive rod 50 by a lever arm 71 which is perpendicular to the plane of the magnet 40 while, in Figure 7, a non-magnetic inertia body 74 is attached to the rod 50 by a lever arm 75, the inertia body and arm being positioned between the legs of the horse shoe magnet 40.

In Figure 8, I have disclosed a magnetostriction type geophone particularly adapted for use as a rotational geophone which is sensitive to ground roll. In this example, the central portion of a lever 78 is secured to the middle of the magnetostrictive rod 50 and inertia bodies 79, 80 are carried at the respective ends of the lever 78 at equal distances from the magnetostrictive rod 50. With this arrangement, the axis of rotation of the geophone, that is the axis of rod 50, is made perpendicular to a line connecting the "shot point" and the "geophone station." When so positioned, relative rocking movement is effected between the support and the inertia bodies 79, 80 in response to rocking movement of the geophone case or support caused by surface waves or ground roll proceeding from the shot point. This rocking movement varies the torsional strain in the magnetostriction rod thereby inducing a current in the pickup coil in much the same manner as indicated in connection with Figures 1 to 4.

In Figures 9 and 10, I have illustrated an arrangement wherein two geophone units, similar to those already described, are connected in parallel to obtain increased sensitivity. Each geophone unit comprises a magnet 40, a magnetostrictive rod 50, and a pickup coil 55 similar to those already described, the coils 55 being interconnected by conductors 81, 82 which correspond to the conductors 59 and 60, respectively, of Figure 1. Each magnetostrictive rod 50 has a lever arm 84 connected thereto and these lever arms are interconnected by a nonmagnetic member 85 which carries an inertia body 86 at the central portion thereof. In these figures, relative movement between the inertia body 86 and the magnets 40 induces similar currents in the pickup coils 55 resulting from torsional strain of the rods 50. These currents are additive due to the interconnection of the coils and result in an increased current in the indicating apparatus connected to the geophone.

It will be apparent that I have disclosed a geophone which includes a minimum number of parts and makes use of the magnetostrictive principle. This results in a very sensitive and accurate indication of earth tremors communicated to the geophone case. Although, in the described structures, changes in magnetic flux density have been effected by torsional strains, I contemplate that tensile or compressive magnetostrictive strains may be utilized in some cases. Due to the novel series opposing connection of the respective sections of the pickup coil, induced voltages responsive to stray fields and voltages resulting from distortion of the coil by the magnetostrictive member tend to cancel out without affecting the desired signal caused by the earth tremors, which results in increased accuracy of operation. Finally, it will be apparent that the principles of this invention are applicable to various types of geophones, such as acceleration type, displacement type, and rotational geophones.

While the invention has been described in connection with a present, preferred embodiment thereof, it is to be understood that this description is illustrative only and is not intended to limit the invention, the scope of which is defined by the appended claims.

I claim:

1. A magnetostriction seismometer comprising, in combination, a seismometer case including a support, a horse shoe type permanent magnet pivotally mounted on said support, adjusting screws carried by said support to effect limited movement of said permanent magnet about said pivot, the ends of said magnet having aligned grooves formed therein, a rod of magnetostrictive material of uniform diameter throughout its length, said rod having bent end portions lying in different lateral planes whereby an initial torsional strain is applied to said rod when it is inserted into the aligned grooves in said magnet, a dual section pickup coil wound on said rod, the sections of said coil being mounted in the field established by said permanent magnet, and the magnetic lines of force constituting said field traversing said coils in a generally longitudinal direction referred to said rod, the sections of said coil being connected in series opposing relationship, and an inertia body mechanically connected to said rod between the sections of said coil whereby movement of said case relative to said inertia body resulting from earth tremors causes a twisting movement of said rod thereby distorting the magnetic lines of force and causing them to cut the sections of said pickup coil, the resulting induced potential in the coil sections being additive due to said series opposing connection.

2. A magnetostriction seismometer in accordance with claim 1 in which the inertia body is mechanically connected to the rod by a rigid elongated arm having one end thereof fixed to the central portion of said rod between the sections of said coil and having said inertia body fixed to the other end thereof, said arm lying generally in the plane of said horse shoe type magnet, being generally perpendicular to the rod, and lying outside the region bounded by said magnet and said rod.

3. A magnetostriction seismometer in accordance with claim 1 in which the inertia body is mechanically connected to the rod by a rigid elongated arm having one end thereof fixed to the central portion of said rod between the sections of said coil and having said inertia body fixed to the other end thereof, said arm being secured to the central portion of said rod, being generally perpendicular to said rod and lying in a plane generally perpendicular to the plane of said horse shoe type permanent magnet.

4. A magnetostriction seismometer in accordance with claim 1 in which the inertia body is mechanically connected to the rod by a rigid elongated arm having one end thereof fixed to the central portion of said rod between the sections of said coil and having said inertia body fixed to the other end thereof, said arm being secured to the central portion of said rod between the sections of said coil, being generally perpendicular to said rod, and being disposed substantially in the plane of said horse shoe type permanent magnet, said inertia body being disposed in the region bounded by said magnet and said rod.

5. A magnetostriction seismometer constructed in accordance with claim 1 in which the inertia body has two sections disposed at the respective ends of a rigid lever, said lever having its central portion secured to the central portion of said rod between the sections of said coil, and said lever being perpendicular to said rod.

6. A magnetostriction seismometer constructed in accordance with claim 1 in which there is a second horse shoe type permanent magnet having aligned grooves formed therein, a second rod of magnetostrictive material of uniform diameter throughout its length, said second rod having bent end portions lying in different lateral planes whereby an initial torsional strain is applied to said second rod when it is inserted into the aligned grooves in said second magnet, a second dual section pickup coil wound on said second rod, the sections of said second coil being mounted in the field established by said second permanent magnet, and the magnetic lines of force constituting said field traversing said coils in a generally longitudinal direction referred to said second rod, the sections of said second coil being connected in series opposing relationship, a first rigid lever arm having one end thereof secured to the central portion of said first rod between the sections of the first pickup coil, a second rigid lever arm having one end thereof secured to the central portion of said second arm between the sections of said second coil, and a non-magnetic member having its ends secured to the respective other ends of said rigid lever arms, said inertia body being secured to and carried by the central portion of said non-magnetic member.

CHARLES G. CRUZAN.

References Cited in the file of this patent

UNITED STATES PATENTS

| Number | Name | Date |
|---|---|---|
| 1,834,498 | Parshall | Dec. 1, 1931 |
| 2,051,200 | Christenson | Aug. 18, 1936 |
| 2,111,643 | Salvatori | Mar. 22, 1938 |
| 2,338,732 | Nosker | Jan. 11, 1944 |
| 2,359,245 | Ritzmann | Sept. 26, 1944 |
| 2,440,903 | Massa | May 4, 1948 |
| 2,471,542 | Rich | May 31, 1949 |
| 2,511,178 | Roters | June 13, 1950 |

FOREIGN PATENTS

| Number | Country | Date |
|---|---|---|
| 852,150 | France | Oct. 16, 1939 |

OTHER REFERENCES

Radiocraft, November 1946, pp. 16 and 65.